3,737,479
COMPOSITION OF POLYORGANOSILOXANE AND
POLYPHENYLENE OXIDE
William R. Haaf, Voorhesville, N.Y., assignor to
General Electric Company
No Drawing. Filed Aug. 19, 1970, Ser. No. 65,285
Int. Cl. C08g 47/10, 43/02; C08f 33/08
U.S. Cl. 260—824 R       27 Claims

ABSTRACT OF THE DISCLOSURE

There are provided thermoplastic compositions with improved drop-weight impact resistance comprising a polyorganosiloxane and a polyphenylene oxide, optionally containing styrene resins and a minor proportion of a polyolefin.

---

This invention relates to thermoplastic compositions useful to produce molded articles. More particularly, it relates to compositions of polyphenylene oxides and polyorganosiloxanes, which have improved drop-weight impact strength.

BACKGROUND OF THE INVENTION

The polyphenylene oxides are disclosed and claimed in A. S. Hay, U.S. 3,306,875. Polyphenylene oxides modified with styrene resins are disclosed and claimed in Cizek, U.S. 3,383,435. These polymers have excellent properties, and in particular, outstanding mechanical and electrical properties over a wide temperature range.

Unmodified polyphenylene oxide resins have been characterized by somewhat lower than expected impact strength as measured by the notched Izod test. The modified polyphenylene oxide resins exhibit better properties in this test, especially if a rubber modified high-impact polystyrene is used as the styrene resin. However, both the unmodified and the modified polyphenylene oxides exhibitor poor drop-weight impact resistance. An improvement in this property would be decidedly advantages because, for example, it would permit molding of sturdy pieces with thin sections from such compositions.

It has now been unexpectedly found that drop-weight impact resistance can be substantially improved by dispersing a small quantity of a polyorganosiloxane in a polyphenylene oxide or one which has been modified with a styrene resin. Polyphenylene oxide modified with styrene resins include melt blended products as well as compositions with styrene grafted with other materials, e.g., rubber, copolymers and interpolymers thereof with styrene and other monomer constituents and those where part of if not all of the styrene is grafted onto the polyphenylene oxide.

Curiously enough, none of the other uniquely advantageous properties of polyphenylene oxide seem to be greatly affected. In addition, the notched Izod impact strength is hardly changed.

It has also been found that if a small proportion of a polyolefin is included in the new compositions, articles can be molded from them which have substantially enhanced Izod impact strengths without sacrificing the remarkable drop-weight impact resistance.

It is therefore, a primary object of this invention to provide polyphenylene oxide compositions with enhanced impact resistance.

It is a further object of this invention to provide polyphenylene oxide resins, modified with styrene resins, with enhanced impact resistance.

Still another object of this invention is to increase the drop-weight impact resistance of polyphenylene oxide resins by adding polyorganosiloxanes without sacrificing other properties of the resins.

A further object of this invention is to enhance both the drop-weight and the notched Izod impact resistance of polyphenylene oxides by adding both polyorganosiloxanes and polyolefins without sacrificing other properties of the resins.

DESCRIPTION OF THE INVENTION

The above-enumerated advantages and objects are achieved with the novel high impact strength polymer compositions of this invention which comprise, in their broadest aspects, compositions of (a) a polyorganosiloxane; (b) a polyphenylene oxide and, optionally, (c) a styrene resin.

The polyorganosiloxanes with which this invention is concerned are characterized by a molecular backbone of alternate atoms of silicon and oxygen, with organic groups attached to the silicon atoms. The types of organic groups, and the extent of crosslinkage between the molecules will determine whether the polyorganosiloxane will be fluids, elastomers or gums.

Any of the usual well-known liquid or gum-like chain stopped polyorganosiloxanes may be used in connection with this invention. Such polyorganosiloxanes may be prepared, for example, by the hydrolysis or hydrolyzable aliphatic- or aromatic-substituted silanes, such as dialiphatic dihalosilanes, for example, dimethyldichlorosilane, followed by complete or partial condensation of the hydrolysis product. They may also be prepared, for example by hydrolyzing mixtures of hydrolyzable diorgano-substituted silanes either among themselves or with hydrolyzable silanes containing, for example, three organic radicals substituted on the silicon atom, for instance, trimethylchlorosilane.

A further method for preparing the organo-substituted polysiloxanes comprises hydrolyzing a diorgano-substituted dihalosilane, isolating the hydrolysis product and effecting reaction between the hydrolyzed product and, e.g., hexamethyl disiloxane in the presence of sulfuric acid. More specific directions for the hydrolysis of hydrolyzable organo-substituted silanes to form organo-substituted polysiloxanes may be found, for example, in patents and in the literature now available in the art.

By the term "hydrolyzable organo-substituted silanes" it is intended to mean derivatives of $SiH_4$ which contain hydrolyzable groups or radicals, for example, halogens, amino groups, alkoxy, aryloxy, acyloxy, radicals, and the like, in addition to the organic groups substituted directly on the silicon atom that are joined to the silicon through carbon-silicon linkages. Examples of such organic radicals are aliphatic radicals including alkyl radicals, for example, methyl, ethyl, propyl, isopropyl, butyl, and the like; alicyclic radicals, for example, cyclopentyl, cyclohexyl, and the like; aryl radicals, for example, phenyl, diphenyl, naphthyl, anthracyl, and the like; aralkyl radicals, for example, benzyl, phenethyl, and the like; alkaryl radicals, for example, tolyl, xylyl, and the like; heterocyclic radicals; as well as hydrolyzable silanes containing two different organic radicals, for example, methyl and phenyl radicals, and the like; attached to the silicon atom. If desired, the above-mentioned radicals may also contain substituents substituted thereon, for instance, halogens, e.g., di-, tri-, and tetra-chlorophenylchlorosilanes, for example, trichlorophenyltrichlorosilane, tetrachlorophenyltrichlorosilane, and the like. The monochlorosilanes, of course, act as chain stoppers.

Hydrolysis of the above silanes or mixtures of silanes results in the formation of silanols, i.e., organo-substituted silanes containing hydroxy groups substituted directly on the silicon, which hydroxy groups almost immediately condense intermolecularly (intercondense) splitting out water to give the siloxane linkages mentioned previously.

Such intercondensations are accelerated by acidic materials, for example, sulfuric acid, hydrochloric acid, ferric chloride, and the like, as well as my basic materials, for example, sodium hydroxide, potassium hydroxide, and the like. As a result of the hydrolysis and condensation, organo-substituted polysiloxanes may be produced which are partially or completely condensed and which may have on an average up to as high as three organic radicals substituted per silicon atom, but preferably from 1.98 to 2.25 organic groups per silicon atom.

Other directions for preparing the organopolysiloxane compositions employed in the practice of the present invention are disclosed and claimed in U.S. 2,469,888 and 2,469,890, granted to the present assignee on May 10, 1949.

Chain-stopped organopolysiloxane gums are also useful in connection with the invention. These are highly viscous masses or gummy elastic solids depending on the state of condensation, the condensing agent employed, and the starting organopolysiloxane used to make the gummy material. A typical gummy organopolysiloxane is obtained by the condensation of a liquid organopolysiloxane containing an average of from about 1.95, preferably from about 1.98 to about 2.05, organic groups per silicon atom. The usual condensing agents which may be employed and which are well known in the art include, for instance, ferric chloride hexahydrate, phenyl phosphoryl chloride, alkaline condensing agents such as potassium hydroxide, sodium hydroxide, and the like. These convertible organopolysiloxanes generally contain polymeric di-organopolysiloxanes which may contain, for example, about 2 mole percent copolymerized mono-organopolysiloxane for example, copolymerized mono methyl-siloxane. Generally, the starting liquid organopolysiloxane is one which contains about 1.999 to 2.01, inclusive, organic groups, for example, methyl groups, per silicon atom and where more than about 90 percent, preferably 95 percent, of the silicon atoms in the polysiloxane contain two silicon-bonded alkyl groups. A typically useful gum is prepared by mixing together about 95 mole percent octamethylcycloetetrasiloxane, and about 5 mole percent octaphenylcyclotetrasiloxane, at a temperature from about 150° C. to 175° C. for about 4 hours with about 0.01 percent potassium hydroxide based on the weight of the siloxane, until a highly viscous, gummy solid is obtained. Generally, the amount of octaphenylcyclotetrasiloxane can be varied up to about 20 mole percent of the total mixture for the purpose of the invention.

A preferred family of polyorganosiloxanes for use in this invention comprises those of the formula

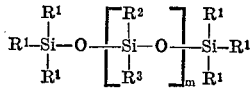

wherein $R^1$ is alkyl, haloalkyl, aryl, aralkyl, alkaryl, alkoxy, aryloxy, and halogenated derivatives of the aforesaid aryl, aralkyl, alkaryl, alkoxy or aryloxy groups.

$R^2$ and $R^3$ are (lower)alkyl or phenyl, and $m$ is an integer of such a value that the polysiloxane is a fluid at ambient temperatures.

The preferred family will thus be limited to polyorganosiloxanes which are fluid, in contrast to being rubber or resinous solids, at ambient temperatures, e.g., about 25° C.

The (lower)alkyl groups in the polyorganosiloxanes will contain from 1 to 6 carbon atoms, straight chain and branched. Special mention is made of a preferred class of polyorganosiloxanes, which includes polymethylphenyl-siloxane, polydimethylsiloxane, polydiphenylsiloxane and copolymers such as methylphenyl and dimethylpoly-siloxane copolymer. Exceptionally good properties have been found with compositions prepared from a poly-methylphenylsiloxane fluid.

The polyphenylene oxides with which this invention is concerned are those having the repeating structural unit of the formula:

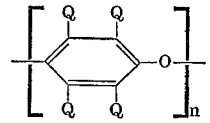

wherein the oxygen ether atom of one unit is connected to the benzene nucleus of the next adjoining unit, $n$ is a positive integer and is at least 100, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus and being free of a tertiary alpha-carbon atom, hydrocarbonoxy radicals being free of a tertiary alpha-carbon atom, and halohydrocarbonoxy radicals having at least 2 carbon atoms between the halogen atom and phenyl nucleus and being free of a tertiary alpha-carbon atom. Examples of suitable polymers may be found in the above referenced patent of Hay.

The preferred polyphenylene oxides may be represented by the following formula:

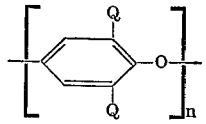

wherein Q is a monovalent substituent selected from the group consisting of hydrogen, hydrocarbon radicals free of a tertiary alpha-carbon atom, halohydrocarbon radicals having at least two carbon atoms between the halogen atom and phenyl nucleus and being free of a tertiary alpha-carbon atom, hydrocarbonoxy radicals free of a tertiary alpha-carbon atom, and halohydrocarbonoxy radicals having at least two carbon atoms between the halogen atom and phenyl nucleus and being free of a tertiary alpha-carbon atom. One but not both Q's can be halogen; and $n$ may represent any whole integer greater than 100.

Typical examples of the monovalent hydrocarbon radicals that Q may be in the above formula are: alkyl, including cycloalkyl, e.g., methyl, ethyl, propyl, butyl, secondary butyl, cyclobutyl, amyl, cyclopentyl, hexyl, cyclohexyl, methylcyclohexyl, ethylcyclohexyl, octyl, decyl, octadecyl, etc.; alkenyl, including cycloalkenyl, e.g., vinyl, allyl, butenyl, cyclobutenyl, isopentenyl, cyclopentenyl, linolyl, etc.; alkynyl, e.g., propargyl, etc.; aryl, including alkaryl, e.g., phenyl, tolyl, ethylphenyl, xylyl, naphthyl, methylnaphthyl, etc.; aralkyl, e.g., benzyl, phenylethyl, phenylpropyl, tolylethyl, etc. The monovalent halo hydrocarbon radicals may be the same as the hydrocarbon radicals, as outlined above, except methyl and alpha-haloalkyl radicals, wherein one or more of the hydrogen atoms are replaced by halogen, to produce halohydrocarbon radicals having at least two carbon atoms between the halogen and the free valence, examples of which are: 2-chloroethyl, 2-bromoethyl, 2-fluoroethyl, 2,2-dichloroethyl, 2- and 3-bromopropyl, 2,2-difluoro-3-iodopropyl, 2-, 3-, and 4-bromobutyl, 2-, 3-, 4-, and 5-fluoroamyl, 2-chlorovinyl, 2- and 3 - bromoallyl, 2- and 3 - fluoropropargyl, mono-, di-, tri-, tetra and pentachlorophenyl, mono-, di-, tri- and tetrabromotolyl, chloroethylphenyl, ethylchlorophenyl, fluoroxylyl, chloronaphthyl, bromobenzyl, iodophenylethyl, phenylchloroethyl, bromotolylethyl, etc.

Typical examples of the monovalent hydrocarbonoxy radicals are: methoxy, ethoxy, propoxy, isopropoxy, butoxy, secondary butoxy, tertiary butoxy, amoxy, hexoxy, octoxy, decoxy, vinoxy, alloxy, butenoxy, parapargoxy, phenyloxy, toloxy, ethylphenoxy, naphthoxy, methylnaphthoxy, benzoxy, phenylethoxy, phenylpropoxy, tolylethoxy, etc. The monovalent halohydrocarbonoxy radicals may be the same as the above oxyhydrocarbons, except methoxy and alpha-haloalkoxy radicals, where on or more of the hydrogens are replaced by a halogen, i.e., fluorine, chlorine, bromine, or iodine, to produce halohydrocarbonoxy radicals having at least two carbon atoms between the halogen and the free valence, a few typical examples of which are: 2-chloroethoxy, 2-bromoethoxy, 2-fluoroethoxy, 2,2 - dichloroethoxy, 2- and 3 - bromopropoxy, 2,2-difluoro-3-chloropropoxy, 2-, 3-, and 4-iodobutoxy, 2-, 3-, 4-, and 5-fluoroamoxy, 2-chlorovinoxy, 2- and 3-bromoalloxy, 2- and 3-fluoropropargoxy, mono, di, tri, and tetrabromotoloxy, chloroethylphenoxy, ethylphenoxy, ethylchlorophenoxy, iodoxyloxy, chloronaphthoxy, bromobenzoxy, chlorophenylethoxy, phenylchloroethoxy, bromotolylethoxy, etc.

Typical examples of polyphenylene oxides which may be employed in this invention are:

poly-(2,6-dimethyl-1,4-phenylene)oxide,
poly-(2,6-diethyl-1,4-phenylene)oxide,
poly-(2,6-dibutyl-1,4-phenylene)oxide,
poly-(2,6-dilauryl-1,4-phenylene)oxide,
poly-(2,6-dipropyl-1,4-phenylene)oxide,
poly-(2,6-dimethoxy-1,4-phenylene)oxide,
poly-(2,6-diethoxy-1,4-phenylene)oxide,
poly-(2-methoxy-6-ethoxy-1,4-phenylene)oxide,
poly-[2,6-di-(chlorophenoxy)-1,4-phenylene]oxide,
poly-[2,6-di-(chloroethyl)-1,4-phenylene]oxide,
poly-(2-methyl-6-isobutyl-1,4-phenylene)oxide,
poly-(2,6-ditolyl-1,4-phenylene)oxide,
poly-[2,6-di-(chloropropyl)-1,4-phenylene]oxide, etc.

The especially preferred polyphenylene oxides are those having alkyl groups of 1–4 carbon atoms, disubstituted ortho- to the oxygen ether atom, i.e., in the formula immediately above, the Q's are each $C_1$–$C_4$ alkyl and most preferably methyl. The most preferred polyphenylene oxide is, therefore, poly(2,6 - dimethyl - 1,4 - phenylene) oxide.

The styrene resin is one having at least 25 percent, by weight, polymer units derived from the compound having the formula:

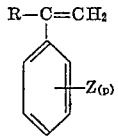

wherein R is hydrogen, (lower)alkyl of 1 to 6 carbon atoms, or halogen; Z is hydrogen, (lower)alkyl of from 1 to 6 carbon atoms or vinyl and $p$ is a whole number equal to from 0 to 5. The term "styrene resin" as used herein and in the appended claims, and defined by the above formula, includes, by way of illustration, homopolymers, such as homopolystyrene and polychlorostyrene; the modified polystyrenes, such as rubber modified high impact polystyrene, and the styrene containing copolymers, such as the styrene-acrylonitrile copolymers (SAN), styrene-butadiene copolymers, styrene-acrylonitrile-alpha-alkyl styrene copolymers, styrene-acrylonitrile-butadiene copolymers (ABS), poly-alpha-methylstyrene, copolymers of ethylvinylbenzene and divinylbenzene, and the like. The preferred styrene resins are homopolystyrene and rubber modified high impact polystyrenes.

The method of dispersing the polyorganosiloxane in the polyphenylene oxide is not critical. The only requirement is that the polyorganosiloxane be homogeneously dispersed throughout the polyphenylene oxide. It is believed that with incomplete or nonhomogeneous dispersions, aggregates tend to form and impair the physical properties of the composition.

The dispersing operation may be carried out by any means known to those skilled in the art. For example, the dispersing operation may be carried out by mixing the two polymers in fluid, granular or powdered form in a Banbury mixer and/or roll mills or mixing may be carried out continuously by means of extrusion of a mixture of polymers. Another convenient method for forming the dispersion consists of dissolving the two polymers in a solvent in which they are mutually soluble and coprecipitating the polymers as a homogeneous composition.

Extrusion has been found to be the preferred manner of blending the components according to this invention as this method was found to give the greatest degree of homogeneity and grafting.

In general, when forming the product by extrusion, the two polymers, in fluid, granular or powder form, are mixed by tumbling. The finer the powder, the greater the degree of homogeneity. The mixture is then fed to the hopper of an extrusion press and extruded at a temperature within the range of 450° to 650° F. In order to insure complete melt-blending of the polyorganosiloxane in the polyphenylene oxide, it may be desirable to pelletize the extruded strand in a chopper and re-extrude under the same extrusion conditions.

Likewise, in the modifications which contain a styrene resin, the means of adding the styrene resin is not critical and does not constitute a part of the invention. The preferred method comprises blending the polymers, extruding the blend, chopping into pellets and re-extruding. Homogeneity and grafting are facilitated.

The amount of polyorganosiloxane which may be added to the polyphenylene oxide, or product of polyphenylene oxide with styrene resin, is that amount of polyorganosiloxane which is compatible with the polyphenylene oxide (or product thereof with styrene resin) and does not segregate out into a separate phase. In general, it has been found that there can be incorporated up to about ten percent (10%) by weight of polyorganosiloxane before incompatibility is noticed. Particularly good results are obtained with additions of between 0.5 and 3 percent by weight of polyorganosiloxane.

It has been found that the polyphenylene oxides and the styrene resins are combinable with each other in all proportions. Consequently, compositions comprising from 0.1 to 10 percent, by weight, of polyorganosiloxane, from 1 to 99.9 percent by weight of polyphenylene ether and from 0 to 98 percent by weight, styrene resin are included within the scope of this invention. In general, compositions containing from 0.5 to 3 percent polyorganosiloxane, from 40 to 85 percent polyphenylene oxide and from 15 to 60 percent styrene resin exhibit the best properties and these compositions are preferred.

In a preferred embodiment of the invention, there is incorporated a polyolefin into the composition. This enhances Izod impact strengths and processability without reducing other properties. Suitable polyolefins include polyethylene, polypropylene and ethylene-propylene copolymer and also polyisoprene, polyisobutylene, and the like.

The amount of polyolefin should be kept at a level which will not unduly diminish properties of the polymer, i.e., rigidity, heat distortion, etc.

The amount of polyolefin which may be added to the product is that amount which is compatible with the product and does not segregate out into a separate phase. In general, it is possible to incorporate up to approximately ten percent (10%) by weight polyolefin with the product before incompatibility is noticed.

Above ten percent (10%), there is a tendency on the part of molded samples to delaminate and the composition begins to weaken. Particularly good results are obtained with additions of between one percent (1%) to three percent (3%) by weight polyolefin.

The drop-weight impact strength is measured as follows:

The Gardner tester is a metal tube, graduated in inches, inside of which a metal dart is free to move. The tube is held vertically over a supporting stage, the flat surface of which is perpendicular to the tube. A plastic specimen (usually a 2½" by 2" by ⅛" chip or a 4" diameter by ⅛″ disc) is mounted on the stage. The impact energy of the metal dart is determined by the height (in inches) to which it is raised before release.

Several specimens are used for test drops to determine the approximate energy needed to produce breaks (or small cracks) in the plastic. Data recording then begins. The first drop is made using a heigh corresponding to the approximate energy determined by the test drops. If the sample shows no evidence of cracking, the next drop is made at a 1″ greater height; if the sample cracks, however, the next drop is made from a 1″ lower height. A fresh specimen is used for each drop. This procedure is repeated for at least 20 specimens. The "50% Failure Value" (in inch-pounds) is calculated as follows:

$$50\% \text{ F. V.} = \frac{\left(\sum_i h_i n_i\right) W}{\sum_i n_i} = \frac{\left(\sum_i h_i n_i\right) W}{N}$$

where $h_i$ is the i-th height in inches
$n_i$ is the number of specimens tested at the i-th height
N is the total number of specimens tested
W is the weight (lbs.) of the metal dart.

DESCRIPTION OF THE PREFERRED EMBODIMENTS

The following examples are set forth as a further description of the invention, but are not to be construed as limiting the invention thereto.

The products were prepared by passing the well mixed ingredients through a variable pitch, single screw extruder with extrusion temperature maintained between 450° and 550° F. dependent upon the particular polymers used. The strands emerging from the extruder were cooled, chopped into pellets, re-extruded, chopped into pellets and molded into test bars using standard procedures.

EXAMPLE 1

Granular poly(2,6-dimethyl-1,4-phenylene)oxide (prepared according to the teachings in Hay, U.S. 3,306,875) is mixed with rubber modified high-impact polystyrene (HT-91 from Monsanto Company) and a methylphenylpolysiloxane (SF-1017 from general Electric Company, which is a water-white liquid containing a high percentage of phenyl groups) and extruded by the general procedure set out above. For comparison purposes, a formulation was made from which the silicone fluid was omitted. The formulations used are set out in Table I:

TABLE I.—COMPOSITIONS OF POLYMETHYLPHENYLSILOXANE, POLY(2,6-DIMETHYL-1,4-PHENYLENE)OXIDE AND RUBBER MODIFIED HIGH IMPACT POLYSTYRENE

| Component | Parts by weight | | |
|---|---|---|---|
| | A | B | C |
| Poly(2,6-dimethyl-1,4-phenylene)oxide | 45 | 45 | 45 |
| High-impact polystyrene Monsanto HT-91 | 55 | 55 | 55 |
| Polyethylene, Microthene 710 | 1.5 | 1.5 | 1.5 |
| Tridecylphosphite stabilizer | 1.0 | 1.0 | 1.0 |
| White titania pigment | 3.0 | 3.0 | |
| Carbon black | | | 0.5 |
| Polymethyphenylsiloxane General Electric SF-1017 | | 2.0 | 2.0 |

The following properties are measured: Tensile yield strength, tensile ultimate strength and tensile elongation (Procedure ASTM-D-638); notched Izod impact strength (Procedure ASTM-D-256); Heat-deflection temperature (Procedure ASTM-D-648); and Gardner falling dart impact. The results are listed in Table II:

TABLE II.—PHYSICAL PROPERTIES OF POLYBLENDS

| | Polyblend | | |
|---|---|---|---|
| | A | B | C |
| Tensile yield strength (p.s.i.) | 9,580 | 9,080 | 9,180 |
| Tensile ultimate strength (p.s.i.) | 8,480 | 8,020 | 8,060 |
| Tensile elongation (percent) | 71.4 | 76.3 | 77.1 |
| Notched Izod impact (ft.-lbs./in. notch) | 1.44 | 1.48 | 1.58 |
| Heat-deflection temp (° F.) | 269 | 263 | 259 |
| Gloss (gloss units) | 53.0 | 55.7 | 51.1 |
| Gardner impact (in.-lbs.) | 49.6 | ≥158 | ≥160 |

As can be seen, in comparison with the control, (A), addition of the polyorganosiloxane, products (B) and (C), causes a substantial improvement in Gardner impact with only slight losses in other properties.

EXAMPLE 2

The following modifications can be made in the formulation designated (B) in Example 1 while still retaining the marked improvement in Gardner (falling-dart) impact resistance in comparison with the products which do not contain the polyorganosiloxane component.

The polymethylphenylsiloxane fluid is mixed into the formulation at 1.0 and 3.0 parts by weight.

The polymethylphenylsiloxane fluid is replaced with the following organopolysiloxanes, obtainable according to the procedures described above, in the indicated amounts, parts by weight of total composition:

dimethylpolysiloxane (General Electric SF-96, 2000 centistokes viscosity), 0.5, 1.0, 2.0, 3.0, 5.0;
dimethylpolysiloxane (General Electric Viscasil, 100,000 centistokes viscosity), 0.5, 1.0, 2.0, 3.0;
dimethylpolysiloxane (General Electric SE-30, colorless gum rubber), 0.5, 1.0, 2.0, 3.0;
methylphenylpolysiloxane (General Electric SE-52, colorless gum, containing 5% phenyl groups), 0.5, 1.0, 2.0, 3.0;
methylphenylpolysiloxane (General Electric SF-1038, water-white liquid, low in phenyl content), 1.0;
dimethyl-diphenylpolysiloxane (water-white liquid, high in phenyl content), 1.0; and
dimethyl-diphenylpolysiloxane (water-white liquid, low in phenyl content), 1.0.

The rubber modified high-impact polystyrene is replaced with an equal weight of crystalline homopolystyrene.

The rubber modified high-impact polystyrene is replaced with equal weights, respectively, of the following:

poly-alpha-methylstyrene;
styrene-acrylonitrile copolymer (73% styrene units);
styrene-acrylonitrile-butadiene copolymer (41% styrene units);
styrene-alpha-methylstyrene copolymer;
styrene-coumarone-indene copolymer;
styrene-methylmethacrylate copolymer;
poly-alpha-chlorostyrene; and
styrene-acrylonitrile-alpha-methylstyrene copolymer.

The styrene resin is omitted and replaced with an equal weight of poly(2,6-dimethyl-1,4-phenylene)oxide.

The polyethylene is omitted and replaced with equal weights of polypropylene and of ethylene-propylene copolymer, respectively.

For the poly(2,6-dimethyl-1,4-phenylene)oxide, there is substituted, respectively, equal weights of the following:

poly(2,6-diethyl-1,4-phenylene)oxide;
poly(2-methyl-6-ethyl-1,4-phenylene)oxide;
poly(2-methyl-6-propyl-1,4-phenylene)oxide;
poly(2,6-dipropyl-1,4-phenylene)oxide; and
poly(2-ethyl-6-propyl-1,4-phenylene)oxide.

For the poly(2,6-dimethyl-1,4-phenylene)oxide there is substituted, respectively, equal weights of the following:

poly(2,6-dilauryl-1,4-phenylene)oxide;
poly(2,6-diphenyl-1,4-phenylene)oxide;

poly(2,6-dimethoxy-1,4-phenylene(oxide;
poly(2,3,6-trimethyl-1,4-phenylene)oxide;
poly(2,3,5,6-tetrapropyl-1,4-phenylene)oxide;
poly(2,6-diethoxy-1,4-phenylene)oxide;
poly(2-methoxy-6-ethoxy-1,4-phenylene)oxide;
poly(2-ethyl-5-stearyloxy-1,4-phenylene)oxide;
poly(2,6-dichloro-1,4-phenylene)oxide;
poly(2,3-dimethyl-5-chloro-1,4-phenylene)oxide;
poly(2-methyl-6-phenyl-1,4-phenylene)oxide;
poly(2,6-dibenzyl-1,4-phenylene)oxide;
poly(3-chloro-1,4-phenylene)oxide;
poly(3,5-diethyl-1,4-phenylene)oxide;
poly(3-ethoxy-1,4-phenylene)oxide;
poly(2-chloro-1,4-phenylene)oxide; and
poly(2,5-dibromo-1,4-phenylene)oxide.

Because of their excellent physical, mechanical, chemical, electrical and thermal properties, the polymer products of this invention have many and varied uses. For example, they can be used in molding powder formulations, either alone or mixed with other polymers and may contain various fillers, such as wood flour, diatomaceous earth, carbon black, silica, etc., as well as reinforcements such as glass filaments, etc., to make molded parts, such as spur, helical, worm or bevel gears, ratchets, bearings, cams, impact parts, gaskets, valve seats for high pressure oil and gas systems or other chemical fluids requiring resistance to chemicals, etc. They can be used to prepare molded, calendered, or extruded articles, films, coatings, threads, filaments, tapes and the like. They can be applied to a broad spectrum of uses in the form of sheets, rods, tapes, etc. and are useful in electrical applications, such as in cable terminals, terminal blocks, backing for electrical circuits, as components of dynamoelectric machines that operate at high temperatures, etc. Films of these materials can be prepared by suitable means, such as by calendering extrusion, etc. These films are useful as metal or fiber liners, containers, covers, closures, electrical insulating tapes, as sound recording tapes, magnetic tapes, photographic films, pipe and wire tapes, etc. As a coating material they can be applied as a solution or suspension to any convenient foundation where a surface possessing their excellent properties is desired. They can be used as an encapsulation material, for electrical insulation, for example, as a wire enamel, potting compound, etc. Fibers produced from the polymers can be woven into fabrics, useful in many applications, for example, as filter cloths where high chemical and heat-resistance is desired. Their excellent electrical properties make laminates of this material useful for electrical equipment, such as slot wedges in the armature of an electric motor, panel boards for printed circuits, electrical appliance panels, radio and television panels, small punched electrical pieces, transformer terminal boards, transformer coil spacers, etc. The polymers may also be mixed with various fillers, modifying agents, etc. such as dyes, pigments, stabilizers, plasticizers, etc.

Obviously, other modifications and variations of the present invention are possible, in the light of the above teachings. It is, therefore, to be understood that changes may be made in the particular embodiments of the invention described which are within the full intended scope of the invention as defined by the appended claims.

I claim:
1. A composition comprising
(a) from 0.1 to 3 percent by weight of the total composition of a polyorganosiloxane of the formula

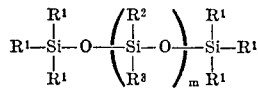

wherein $R^1$ is alkyl, haloalkyl, aryl, aralkyl, alkaryl, alkoxy, aryloxy and halogenated derivatives of the aforesaid aryl, aralkyl, alkaryl, alkoxy or aryloxy groups $R^2$ and $R^3$ are (lower) alkyl or phenyl and $m$ is an integer of such a value that the polysiloxane is a fluid at ambient temperatures;

(b) from 1 to 99.9 percent by weight of a polyphenylene oxide of the formula

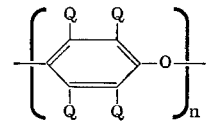

wherein the oxygen ether atom of one unit is connected to the benzene nucleus of the next repeating unit, $n$ is a positive integer and is at least 100, and each Q is a monovalent substituent selected from hydrogen, halogen, hydrocarbon radicals being free of a tertiary alpha-carbon atom, halohydrocarbon radicals having at least two carbon atoms between the halogen atom and phenyl nucleus and being free of a tertiary alpha-carbon atom, hydrocarbonoxy radicals being free of a tertiary alpha-carbon atom and halohydrocarbonoxy radicals having at least 2 carbon atoms between the halogen atom and phenyl nucleus and being free of a tertiary alpha-carbon atom; and (c) up to 98 percent by weight of a styrene resin having at least 25% polymer units derived from the compound having the formula

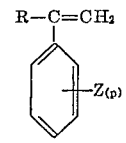

wherein

R is hydrogen, (lower) alkyl or halogen,

Z is hydrogen, (lower) alkyl or vinyl, and $p$ is a whole integer from 1 to 5.

2. The composition of claim 1 wherein said polyorganosiloxane is polymethylphenylsiloxane, polydimethylsiloxane, polydiphenylsiloxane, or a methylphenyl and dimethylpolysiloxane copolymer.

3. The composition of claim 2 wherein said polyorganosiloxane is polymethylphenylsiloxane.

4. The composition of claim 1 wherein said polyphenylene ether is poly-(2,6-dimethyl-1,4-phenylene)oxide.

5. The composition of claim 1 wherein said styrene resin is homopolystyrene.

6. The composition of claim 1 wherein said styrene resin is a rubber modified high-impact polystyrene.

7. The composition of claim 1 which includes from 1 to 10 percent by weight of a polyolefin.

8. The composition of claim 7 wherein said polyolefin is polyethylene, polypropylene, or an ethylene-propylene copolymer.

9. A composition comprising
(a) from 0.1 to 3 percent by weight of the total composition of a polyorganosiloxane of the formula

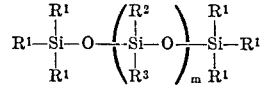

wherein $R^1$ is alkyl, haloalkyl, aryl, aralkyl, alkaryl, alkoxy, aryloxy, and haogenated derivatives of the aforesaid aryl, aralkyl, alkaryl, alkoxy or aryloxy groups, $R^2$ and $R^3$ are (lower) alkyl or phenyl and $m$ is an integer of such a value that the polyorganosiloxane is a fluid at ambient temperatures;

(b) from 1 to 99.9 percent of a polyphenylene oxide of the formula

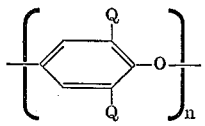

wherein

Q is alkyl of from 1 to 4 carbon atoms and
n is a whole integer of at least 100; and
(c) up to 98 percent of a styrene resin having at least 25 percent polymer units derived from the compound having the formula

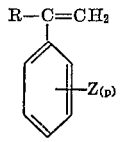

wherein

R is hydrogen, (lower) alkyl or halogen,
Z is hydrogen, (lower) alkyl and vinyl, and
p is a whole integer equal to from 1 to 5.

10. The composition of claim 9 wherein said polyorganosiloxane is polymethylphenylsiloxane, polydimethylsiloxane, polydiphenylsiloxane, or a methylphenyl and dimethylpolysiloxane copolymer.

11. The composition of claim 10 wherein said polyorganosiloxane is polymethylphenylsiloxane.

12. The composition of claim 9 wherein said polyphenylene ether is poly-(2,6-dimethyl-1,4-phenylene) oxide.

13. The composition of claim 9 wherein said styrene resin is homopolystyrene.

14. The composition of claim 9 wherein said styrene resin is a rubber modified high-impact polystyrene.

15. The composition of claim 9 which includes from 1 to 10 percent by weight of a polyolefin.

16. The composition of claim 15 wherein said polyolefin is polyethylene, polypropylene or an ethylene-propylene copolymer.

17. The composition of claim 9 wherein the polyorganosiloxane constitutes from 0.5 to 3 percent of the composition, the polyphenylene oxide constitutes from 40 to 85 percent of the composition and the styrene resin constitutes from 15 to 60 percent of the composition.

18. A composition comprising
(a) from 0.1 to 3 percent by weight of the total composition of a polyorganosiloxane of the formula

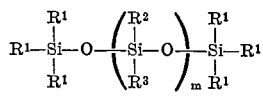

wherein $R^1$ is alkyl, haloalkyl, aryl, aralkyl, alkaryl, alkoxy, aryloxy, and halogenated derivatives of the aforesaid aryl, aralkyl, alkaryl, alkoxy or aryloxy groups,
$R^2$ and $R^3$ are (lower) alkyl or phenyl and
m is an integer of such value that the polyorganosiloxane is a fluid at ambient temperatures;
(b) from 1 to 99.9 percent of poly-(2,6-dimethyl-1,4-phenylene)oxide; and
(c) up to 98 percent of a styrene resin having at least 25 percent polymer units derived from the compound having the formula

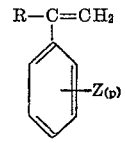

wherein

R is hydrogen, (lower) alkyl or halogen,
Z is hydrogen, (lower) alkyl or vinyl and
p is a whole integer from 1 to 5.

19. The composition of claim 18 wherein said polyorganosiloxane is polymethylphenylsiloxane, polydimethylsiloxane, polydiphenylsiloxane, or a methylphenyl and dimethylpolysiloxane copolymer.

20. The composition of claim 19 wherein said polyorganosiloxane is polymethylphenylsiloxane.

21. The composition of claim 18 wherein said styrene resin is homopolystyrene.

22. The composition of claim 18 wherein said styrene resin is a rubber modified high-impact polystyrene.

23. The composition of claim 18 which includes from 1 to 10 percent by weight of a polyolefin.

24. The composition of claim 23 wherein said polyolefin is polyethylene, polypropylene or an ethylene-propylene copolymer.

25. The composition of claim 24 wherein said polyolefin is polyethylene.

26. The composition of claim 18 wherein the polyorganosiloxane constitutes from 0.5 to 3 percent of the composition, the polyphenylene oxide constitutes from 40 to 85 percent of the composition and the styrene resin constitutes from 15 to 60 percent of the composition.

27. The composition of claim 23 wherein the polyorganosiloxane constitutes from 0.5 to 3 percent of the composition, the polyphenylene oxide constitutes from 40 to 85 percent of the composition, the styrene resin constitutes from 15 to 60 percent of the composition, and wherein the polyolefin is polyethylene and constitutes from 1 to 3 percent of the composition.

References Cited
UNITED STATES PATENTS

| | | | |
|---|---|---|---|
| 3,063,872 | 11/1962 | Boldebuck | 260—824 |
| 3,383,435 | 5/1968 | Cizek | 260—874 |
| 3,356,761 | 12/1967 | Fox | 260—874 |
| 3,536,657 | 10/1970 | Noshay et al. | 260—824 |
| 3,665,051 | 5/1972 | Bussink | 260—824 |

SAMUEL H. BLECH, Primary Examiner

U.S. Cl. X.R.

117—161 ZA; 260—9 R, 37 SB, 41 R, A, AG, B, 827